United States Patent [19]
Yamato

[11] 3,815,255
[45] June 11, 1974

[54] FLUIDIZED BED DRYER

[75] Inventor: Yukio Yamato, Tokyo, Japan

[73] Assignee: Yamato Sanko Mfg., Ltd., Tokyo, Japan

[22] Filed: Sept. 20, 1972

[21] Appl. No.: 290,764

[30] Foreign Application Priority Data
Oct. 8, 1971   Japan.............................. 46-78633

[52] U.S. Cl........................... 34/57 D, 259/DIG. 17
[51] Int. Cl.............................................. F26b 17/10
[58] Field of Search.......... 34/10, 57 R, 57 A, 57 D; 432/15, 58; 259/DIG. 17, 4, 112, 113, 114

[56] References Cited
UNITED STATES PATENTS

| | | | |
|---|---|---|---|
| 2,460,008 | 1/1949 | Heller | 34/57 D X |
| 2,513,369 | 7/1950 | Shaw | 34/10 |
| 3,646,689 | 3/1972 | Kuchenthal et al | 34/57 D X |
| 3,711,962 | 1/1973 | Fukuyo | 34/57 D |

Primary Examiner—William F. O'Dea
Assistant Examiner—William C. Anderson
Attorney, Agent, or Firm—Stewart and Kolasch, Ltd.

[57] ABSTRACT

A fluidized bed dryer containing means for effecting fluidization and transportation of a material being treated from the inlet or supply side of a treatment housing to the exit or discharge side, including the utilization of a gas distributor in cooperation with a heating gas which is applied to the materials through said distributor. The dryer can be used to process a variety of difficult-to-treat materials such as a slurry of materials, and materials containing solidified portions as well as those having a high degree of cohesion, adhesion and/or containing lumps.

7 Claims, 11 Drawing Figures

PATENTED JUN 11 1974 3,815,255
SHEET 1 OF 2
FIG 1
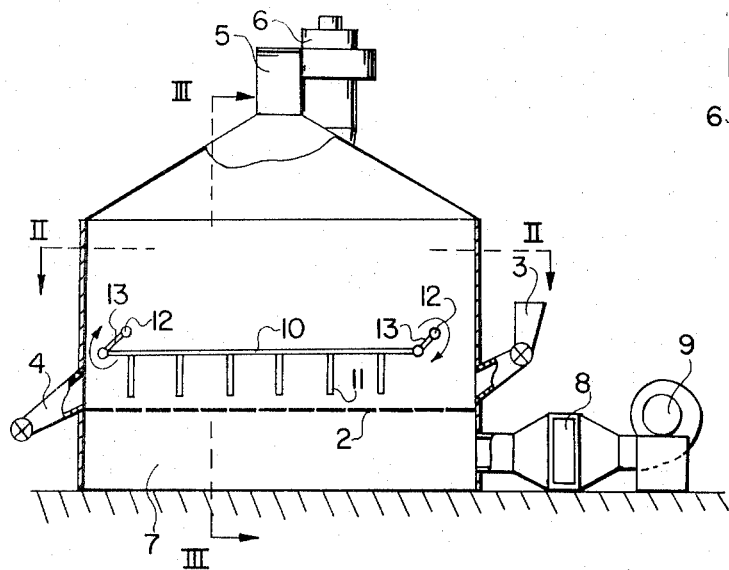
FIG 3
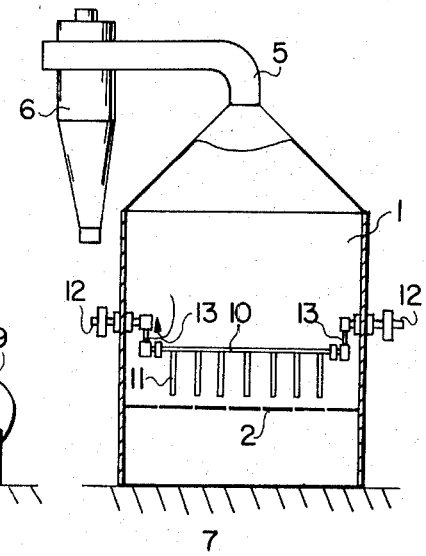
FIG 2
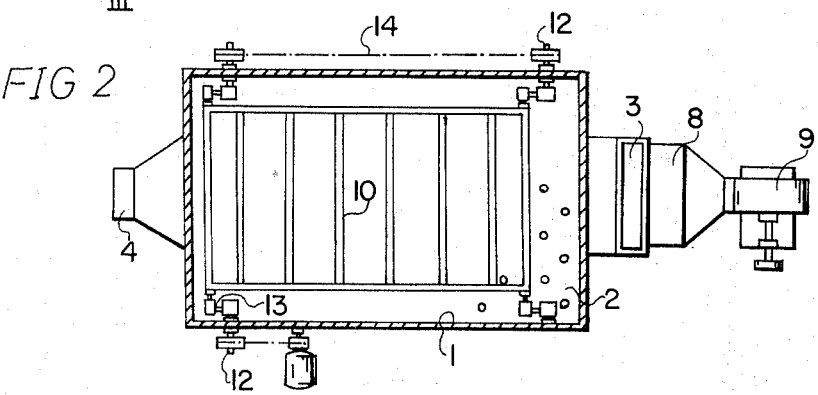
FIG 4
FIG 5
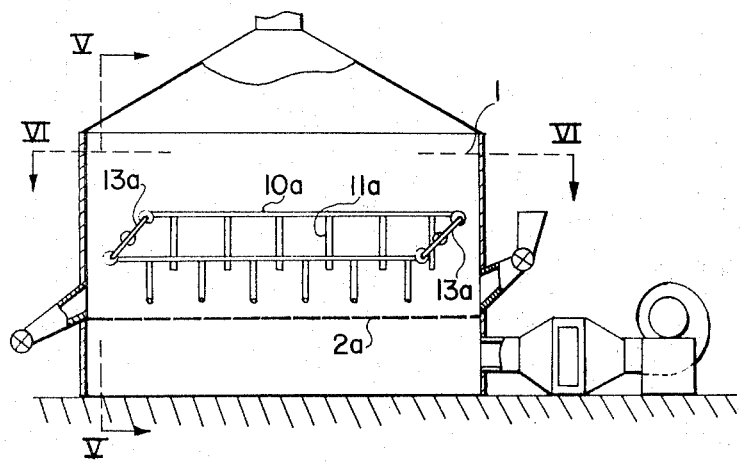

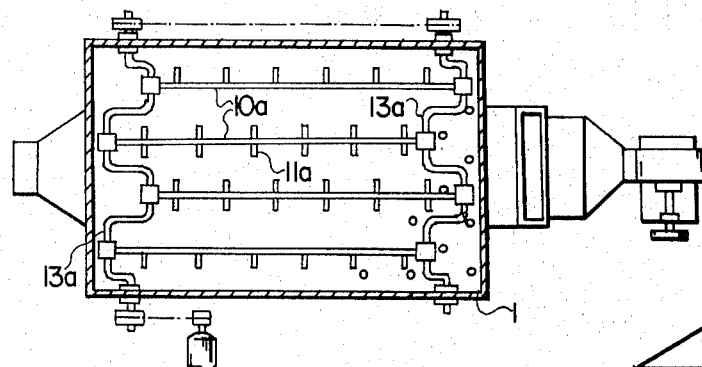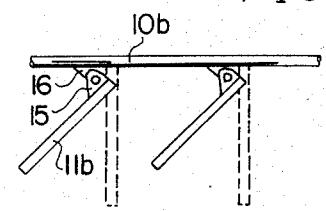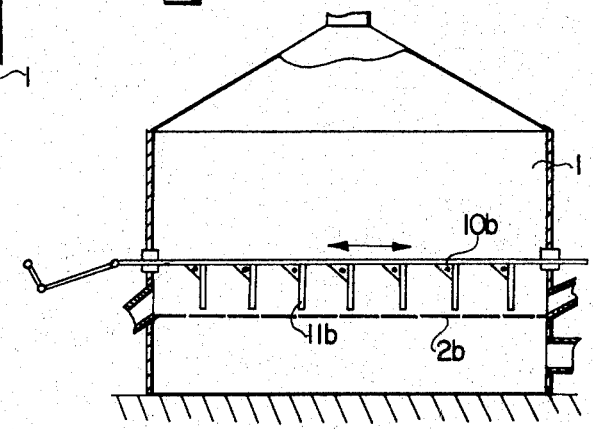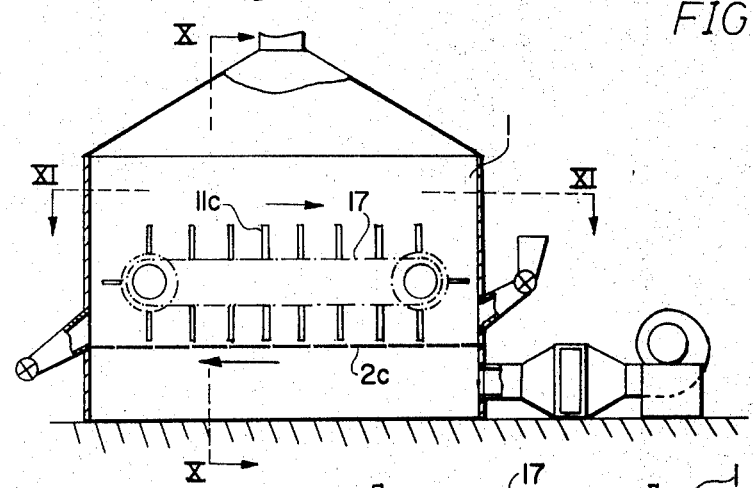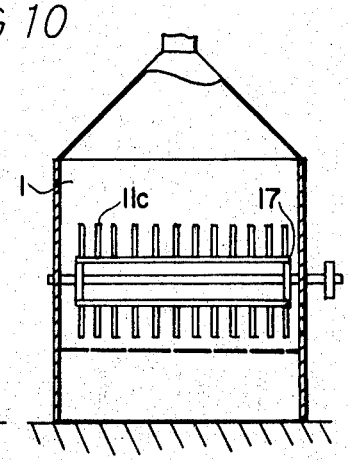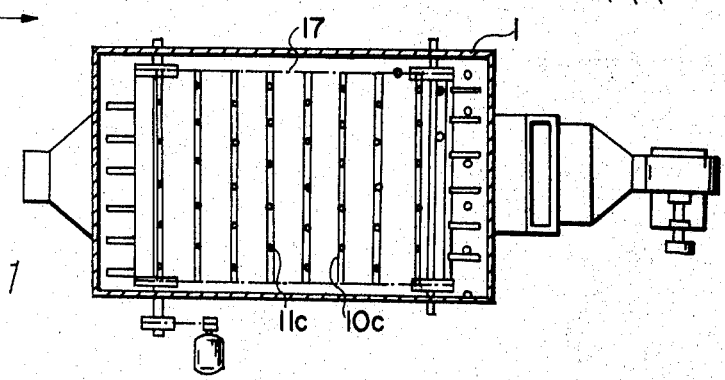

FLUIDIZED BED DRYER

BACKGROUND AND SUMMARY OF THE INVENTION

The present invention relates to a drying apparatus which can be used for processing materials, including the drying, cooling, roasting and calcination of said materials. More particularly, the present invention is directed to a novel and improved fluidized bed dryer having mechanical handling means for accelerating the fluidization and transportation of materials which, in the past, were not treatable using the conventional fluidized bed dryers.

Because of its ability for use in mass production as well as its simplicity of construction, a fluidized bed dryer is very suitable for drying and roasting powder, particle and lump-type materials and particularly for treating materials having a low moisture content. In the fluidized bed dryer, solid materials are supplied to a gas distributor plate (perforated plate) and a heated or cooled gas is introduced into a plenum chamber or wind box beneath the distributor plate. The gas introduced into the plenum chamber is thus uniformly distributed through the perforated distributor plate into the material to be treated. During the treatment process the solid material is floated on the gas to form a fluidized layer and as such, the solid phase and the gas phase are intermixed with each other and behave like a boiling fluid, wherein the solid phase is caused to be agitated and mixed together with the gas phase.

Heretofore, it has been impossible for conventional fluidized bed dryers to treat materials which contain a large amount of liquid, for example, water, materials which possess an extensive amount of adhesion, cohesion and solidification and also materials having a large particle size and a wide distribution of particle sizes. The reason for this is that such materials have a tendency to stick together and also stick to the surface of the perforated plate and thus choke the apertures through which the heated gas is introduced into the material being treated. In such devices there is no possibility to achieve fluidization and/or conveyance of the lumps from the supply inlet of the dryer to the dryer outlet.

Accordingly, it is an object of the present invention to provide an improved fluidized bed dryer which can be used to treat not only the materials which can be treated in the conventional fluidized-bed dryer but also materials which heretofore could not be handled by conventional dryers.

Another object of the present invention is to provide an improved fluidized bed dryer wherein materials having a high moisture content, such as a slurry or sludge, can be treated as well as materials having a low moisture content.

A further object of the present invention is to provide an improved fluidized bed dryer which is capable of treating materials having adhesion, cohesion and/or solidification properties.

Still another object of the present invention is to provide an improved fluidized bed dryer wherein the materials which can be treated include non-fluidizable lumps.

A still further object of the present invention is to provide a fluidized bed dryer that contains a gas distribution system and mechanical handling means for effecting fluidization and transportation of the materials being treated from the inlet to the outlet of the dryer.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved fluidized bed apparatus and method for drying, cooling, roasting, calcining and the like has been developed which is capable of processing materials having a large moisture content as well as materials containing high adhesion, cohesion and/or solidification properties. The fluidized bed dryer of the present invention comprises a housing and a gas distributor plate mounted in the housing which divides said housing into upper and lower chambers. An inlet port is provided on one side of the housing for introducing the material to be treated and an outlet port is located on the other side of said housing for removing the treated material. A gas supply device is connected to the lower chamber and a gas exhaust device having a cyclone dust separator is provided at the top of the upper chamber. The gas distributor contains a plurality of apertures which places said upper and lower chambers into ventilative communication with each other. A conveying device is mounted in the upper chamber and comprises carriage means and a plurality of blades mounted thereon and projecting therefrom for engaging the materials disposed on the gas distributor plate. The carriage means is driven in such a manner that the blades are caused to scratch and fluidize the material being treated in cooperation with a heated gas. The fluidized bed is thus thrust towards the outlet port. The blades on the carriage means extend in close proximity to the surface of the gas distributor plate and advantageously contain a straight, curved or T-shape.

In a preferred embodiment of the present invention, the carriage includes a crank mechanism for effecting a circular or linear movement of the blades. The carriage means can also have a chain drive system for effectng a predetermined movement of the blades. In one of the features of the present invention, the blade is mounted on the carriage means in such a manner that each blade is retained fixed and perpendicular to the gas distributor in the forward stroke of the carriage means, but swings upwards towards the carriage means in the return stroke.

BRIEF DESCRIPTION OF THE DRAWINGS

The present invention will become more fully understood from the detailed description given hereinbelow and the accompanying drawings, which are given by way of illustration only and thus are not limitative of the present invention and wherein, FIG. 1 is an elevation, partially in section, of one of the embodiments of the fluidized bed dryer of the present invention;

FIG. 2 is a section taken along the line II—II of FIG. 1;

FIG. 3 is a section taken along the line III—III of FIG. 1;

FIG. 4 is an elevation, partially in section, of another embodiment of the fluidized bed dryer of the present invention;

FIG. 5 is a section taken along the line V—V of FIG. 4;

FIG. 6 is a section taken along the line VI—VI of FIG. 4;

FIG. 7 is an elevation, partially in section, of still another embodiment of the fluidized bed dryer of the present invention;

FIG. 8 is a view illustrating, on an enlarged scale, the conveying blades of FIG. 7;

FIG. 9 is an elevation, partially in section, of still a further embodiment of the dryer of the present invention;

FIG. 10 is a section taken along the line X—X of FIG. 9; and

FIG. 11 is a section taken along the line XI—XI of FIG. 9.

DESCRIPTION OF THE PREFERRED EMBODIMENTS

Referring to FIGS. 1–3, the fluidized bed dryer illustrated therein comprises a housing 1 containing a perforated plate 2 which divides the housing into an upper and lower chamber. An inlet port 3 is provided on one side wall of the housing for supplying the material to be treated and an outlet port 4 is provided on the opposite side wall of the housing for discharging the product. An exhausting device 5 communicates with the upper chamber for removing the gaseous materials therefrom and said exhausting device is provided with a cyclone separator 6 for removing small solid particles from said gaseous materials. The lower chamber defines a plenum chamber or wind box 7. Heated air is supplied to the wind box by a fan 9 and said air can be heated by a heater 8 which is associated with the fan. A carriage frame 10 is located above the perforated plate and a plurality of blades 11 are mounted to said frame. Each blade is fixed to the frame and extends from the frame to a point in close proximity to the surface of the perforated plate 2. The frame 10 has its opposite sides thereof pivoted to crank arms 13 which are in cooperative association with the respective rotary shafts 12. Thus, upon rotation of the crank, the blades 11 repeatedly contact and thrust the material being treated from the inlet to the outlet of the housing. A pair of front and rear rotary shafts 12 are driven to rotate in synchronism with each other by the use of a common belt 14. It will be apparent that the above described crank mechanism can be replaced by any other mechanical means, such as a cam system or a cylinder mechanism to achieve the desired result.

In the treatment process according to FIGS. 1–3, the material to be treated is introduced through the inlet port 3 and deposited on the perforated plate 2. Air is introduced through the heater 8 to the wind box 7 by fan 9. The air which is now hot is blown up through the apertures in the plate 2 which rapidly heats up the material surrounding said apertures. While the heated air is being applied to the material, the frame 10 is moved, as directionally shown by the arrows in FIG. 1, by a crank mechanism in a manner such that the blades 11 repeatedly contact the material for effecting their fluidization and said fluidized bed is simultaneously conveyed towards the outlet port 4. At first the blades 11 merely scratch the material forming vertical grooves therein which serve as passage ways for the heated air. Accordingly, the material along the grooves undergoes a drying and a roasting treatment. The material so treated becomes ready to be fluidized and thus is transported by the succeeding blades through the housing 1, thereby completely treating the material and finally discharging it from the housing through the outlet port 4. The heated air is drawn from the housing through the exhauster 5 and dust contained in the air is removed by cyclone separator 6.

The fluidized bed dryer of the present invention can be used to treat materials for which conventional dryers are ineffective, such as, the treatment of muddy materials having a high moisture content, such as a slurry or a sludge, or solid materials having adhesion, cohesion and solidification properties and/or materials containing a wide distribution of lumps.

In the case where the material being treated is solid material containing fractions which the blade 11 cannot crush, for example lumpy admixtures and/or solidified ingredients, the blade is still effective in gradually pushing these fractions out of the dryer housing so that they do not remain for a long time in the dryer and thus do not interrupt the normal material treatment process. It should be noted that the end portion of the blades 11 passes in close proximity to the apertures of the perforated plate, which aids in cleaning the surface thereof, thereby avoiding the clogging up of the apertures and a reduction in the volume of heated air reaching the material being treated.

In the embodiment shown in FIGS. 4–6, the dryer is provided with a crank mechanism comprising a pair of crank shafts 13a, wherein each crank shaft includes at least two crank pin elements. At least two carriage rails or connecting rods 10a are provided between the respective crank pin elements of the crank shafts 13a. Blades 11a are fixedly mounted in a row on each rod 10a. The crank pin elements are disposed alternatively opposing each other and spaced the same distance from a common shaft axis. Upon rotation of the crank, the rods are alternatively moved, as shown by the arrows in FIG. 5, to cause the blade to scratch, crush and convey the material towards the outlet port.

Curved-shaped blades 11' and T-shaped blades 11'' as well as the straight blades can be readily employed in the dryer of the present invention. Except for the components just described, the remaining components of this embodiment are either identical or very similar to those in FIGS. 1–3.

FIGS. 7 and 8 illustrate still another embodiment of the present invention in which the carriage 10b is arranged so as to reciprocate in the direction shown by the arrow in FIG. 7, substantially parallel to the perforated plate 2b by means of a slide crank and chain mechanism. Each blade 11b has at its base a joint element 15 pivotable to a corresponding joint element 16 of the carriage 10b. In the forward stroke of the carriage, in which the joints 15 and 16 abut each other in a plane parallel to the plate 2b, the blades are fixedly supported perpendicular to the surface of the perforated plate. In the return stroke, as directionally shown by the arrow of FIG. 8, wherein the joint 15 is rotatable relative to the joint 16, the blade swings up so as to substantially disengage the materials.

FIGS. 9–11 illustrate a still further construction of the apparatus of the present invention wherein a pair of sprocket wheels are mounted on each of a pair of shafts, said shafts being driven by a chain drive including a pair of endless chains 17 encircling the sprocket wheels. The chains contain a plurality of carriage bars 10c which bridge the distance between said chains. A row of blades 11c are attached to each of the carriage bars, said blades extending down into the material being treated. Thus, upon rotation of the crank driven shaft in the forward stroke of the bar, as shown directionally by the arrow in FIG. 9, the blades are caused to penetrate into said material providing passageways for the heated air and causing the material to move from the inlet to the outlet port of the dryer.

The following Table shows a comparison between the fluidized bed dryer of the present invention and conventional fluidized bed dryers provided with the standard rotary agitator.

TABLE

| Consideration | Conventional Dryer | Inventive Dryer |
|---|---|---|
| 1. Materials | | |
| Sort | Narrow in range | Wide in range |
| Particle size | Narrow in range | Wide in range |
| Distribution of particle size | Narrow in range | Wide in range |
| Cohesion | Unacceptable, if extensive | Acceptable to some extent, if extensive |
| Adhesion | Unacceptable, if extensive | Acceptable to some extent, if extensive |
| Solidification | Unacceptable, if extensive | Acceptable to some extent, if extensive |
| Dispersion | Unacceptable if poor | Acceptable even if poor |
| Admixture of lumps | Unacceptable | Acceptable |
| Granulation | Limited | Substantially Unlimited |
| 2. Heated Air | | |
| Velocity | Limited | Limited |
| Channelling | Occurs | Does not occur |
| Fluidization | Fluidized-bed | Fluidized-bed and agitation |
| 3. Conveyance | | |
| Reliability | Sometimes jumping and stagnation | Always reliable |
| Residence time | Indefinite, depending on the particle size, etc. | Definite |
| Flow | Mixed flow | Similar to piston motion |
| Control of Processing time | Difficult | Easy |
| 4. Properties of Material Being Supplied | | |
| Thickness | Unacceptable, if thick | Acceptable, even if thick |
| Uniformity | Necessary | Unnecessary |
| Discharge | Indefinite | Definite |
| 5. Perforated Plate | | |
| Choking | Sometimes occurs | Seldom occurs |
| Cleaning | Difficult | Easy |
| 6. Power consumption | Substantial | Small |
| 7. Dust separator required | Large in size | Small in size |
| 8. Mass-treatment | Impossible | Possible |
| 9. Heat efficiency | Low | High |

As described above, the fluidized bed dryer of the present invention can handle the materials that the conventional fluidized bed dryer has been unable to handle, such as those materials having a high degree of moisture content for example, a slurry and/or a sludge, materials which contain a substantial amount of adhesion, cohesion and/or solidification, including lumps having a large size distribution, as well as the so-called industrial wastes. The dryer of the present invention is also effective for the treatment of materials which have been heretofore treated in pneumatic dryers or rotary dryers.

The invention being thus described, it will be obvious to one skilled in the art that the same may be varied in many ways. Such variations are not to be regarded as departures from the spirit and scope of the invention, and all modifications as are embraced by the appended claims are intended to be included within the purview of the present invention.

What is claimed is:

1. An apparatus for fluidizing and drying a material which comprises a housing containing the material to be treated, a perforated gas distributing means dividing said housing into an upper and lower chamber, inlet means for supplying the material to be treated to the housing, gas supply means communicating with the lower chamber for supplying a heated gas to the lower chamber and the gas distributing means, mechanical handling means disposed in the housing in closely spaced juxtaposition to the gas distributing means for facilitating the fluidization and transportation of the material being treated through the housing and outlet means for removing the treated material from the housing, said mechanical handling means comprising a carriage frame mounted for movement in said housing on a pair of conveyor belts, said carriage frame containing a plurality of elongated members extending from said frame to a zone in close proximity to the gas distributing means and said elongated members penetrating the material being treated and moving said material through the housing due to the rotation of said conveyor belts.

2. The apparatus of claim 1, wherein each of said conveyor belts comprises one endless chain encircled around a pair of wheels, said carriage frame being attached to said belts and including a plurality of bars connecting said pair of chains, said plurality of elongated members being fixedly mounted in a row on each bar.

3. The apparatus of claim 1, wherein gas exhaust means communicate with said upper chamber, said gas exhaust means including dust separator means.

4. The apparatus of claim 1, wherein heating means are associated with said gas supply means.

5. The apparatus of claim 1, wherein said elongated members include straight blades.

6. The apparatus of claim 1, wherein said elongated members include curved blades.

7. The apparatus of claim 1, wherein said elongated members include T-shaped blades.

* * * * *